United States Patent
Pappu et al.

(10) Patent No.: US 11,907,858 B2
(45) Date of Patent: Feb. 20, 2024

(54) ENTITY DISAMBIGUATION

(71) Applicant: Yahoo!, Inc., Sunnyvale, CA (US)

(72) Inventors: Aasish Pappu, New York, NY (US); Roi Blanco, Barcelona (ES); Yashar Mehdad, San Jose, CA (US); Amanda Stent, New York, NY (US); Kapil Thadani, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 862 days.

(21) Appl. No.: 15/425,978

(22) Filed: Feb. 6, 2017

(65) Prior Publication Data

US 2018/0225576 A1    Aug. 9, 2018

(51) Int. Cl.
    *G06N 5/04*        (2023.01)
    *G06F 16/36*       (2019.01)

(52) U.S. Cl.
    CPC ............ *G06N 5/04* (2013.01); *G06F 16/36* (2019.01)

(58) Field of Classification Search
    CPC .................................. G06N 5/04; G06N 16/288
    See application file for complete search history.

(56) References Cited

U.S. PATENT DOCUMENTS

| | | | | |
|---|---|---|---|---|
| 5,974,412 A * | 10/1999 | Hazlehurst | ......... | G06F 16/3332 707/999.102 |
| 6,523,026 B1 * | 2/2003 | Gillis | ............ | G06F 16/332 |
| 10,319,374 B2 * | 6/2019 | Catanzaro | ....... | G10L 15/02 |
| 2008/0144942 A1 * | 6/2008 | Besley | ............. | G06V 10/752 382/209 |
| 2011/0106807 A1 * | 5/2011 | Srihari | ............. | G06F 16/288 707/739 |
| 2012/0179642 A1 * | 7/2012 | Sweeney | ........ | G06F 17/2785 706/55 |
| 2012/0254333 A1 * | 10/2012 | Chandramouli | ..... | G06F 40/10 709/206 |
| 2013/0346421 A1 * | 12/2013 | Wang | ............. | G06F 40/295 707/755 |
| 2016/0179945 A1 * | 6/2016 | Lastra Diaz | ........ | G06F 16/367 707/739 |
| 2016/0306794 A1 * | 10/2016 | Huang | ............ | G06F 40/44 |
| 2017/0109907 A1 * | 4/2017 | Hamedani | ........ | G06T 9/00 |

OTHER PUBLICATIONS

Han et al, "Data Mining: concepts and techniques, Chapter 2: Getting to know your data", 2012, Elsevier Inc, Data Mining 3rd edition, 39-82. (Year: 2012).*

Billsus et al, "User Modeling for Adaptive News Access", 2000, User Modeling and User-Adapted Interaction, 10, pp. 147-180. (Year: 2000).*

(Continued)

*Primary Examiner* — Alexey Shmatov
*Assistant Examiner* — Clint Mullinax
(74) *Attorney, Agent, or Firm* — Cooper Legal Group LLC

(57) ABSTRACT

One or more computing devices, systems, and/or methods for entity disambiguation are provided. For example, a document may be analyzed to identify a first mention and a second mention. One or more techniques may be used to select and link a candidate entity, from a first set of candidate entities, to the first mention and select and link a candidate entity, from a second set of candidate entities, to the second mention.

19 Claims, 9 Drawing Sheets

(56) References Cited

OTHER PUBLICATIONS

Gabrilovich et al, "Newsjunkie: Providing Personalized Newsfeeds via Analysis of Information Novelty", 2004, Proceedings of the 13th International Conference on World Wide Web, pp. 482-490. (Year: 2004).*

"Lightweight Multilingual Entity Extraction and Linking", 2017, Aasish Pappu, Roi Blanco, Yashar Mehdad Amanda Stent and Kapil Thadani, reprinted from the Internet at: https://research.yahoo.com/publications/8810/lightweight-multilingual-entity-extraction-and-linking?&fr=yfp-t, 10 pgs.

* cited by examiner

ENTITY DISAMBIGUATION

BACKGROUND

Many services, such as websites, apps, social networks, etc., may store content, organize the content and present the content in various ways. For example, a website may store documents comprising text. The documents may be organized and otherwise presented based upon the text within each document.

In an example, properly organizing and presenting the documents may require properly considering the text of each document. The use of human beings to manually read the text of each document and/or annotate each document may be inaccurate, inconvenient, insufficient and/or inefficient. For example, organizing and presenting a large number of documents may require a considerable amount of time and resources. Thus, the documents may not be available for presentation in a timely manner.

SUMMARY

In accordance with the present disclosure, one or more computing devices and/or methods for linking a mention to an entity are provided. In an example, a request to link mentions (e.g., text spans that identify who, what, where, etc.) in a document (e.g., article) to entities (e.g., people, places, events, etc.) may be received. The document may be analyzed (e.g., scanned) to identify a plurality of mentions, comprising a first mention (e.g., Cleveland) and a second mention (e.g., New York), in the document. A first set of candidate entities, comprising a first candidate entity (C11) (e.g., the city of Cleveland) and a second candidate entity (C12) (e.g., Grover Cleveland), may be retrieved, and may correspond to the first mention. A second set of candidate entities, comprising a third candidate entity (C23) (e.g., the city of New York) and a fourth candidate entity (C24) (e.g., the state of New York), may be retrieved, and may correspond to the second mention. Based upon a forward pass (e.g., of a forward-backward algorithm) of the plurality of mentions, a first matrix may be generated, and may be indicative of a first likelihood (L11) of the first mention corresponding to the first candidate entity (C11), a second likelihood (L12) of the first mention corresponding to the second candidate entity (C12), a third likelihood (L23) of the second mention corresponding to the third candidate entity (C23), and a fourth likelihood (L24) of the second mention corresponding to the fourth candidate entity (C24). Based upon a backward pass (e.g., of the forward-backward algorithm) of the plurality of mentions, a second matrix may be generated, and may be indicative of a fifth likelihood (L15) of the first mention corresponding to the first candidate entity (C11), a sixth likelihood (L16) of the first mention corresponding to the second candidate entity (C12), a seventh likelihood (L27) of the second mention corresponding to the third candidate entity (C23), and an eighth likelihood (L28) of the second mention corresponding to the fourth candidate entity (C24). The first candidate entity (C11) may be selected (e.g., from amongst the first set of candidate entities) and linked to the first mention based upon the first matrix and the second matrix. The third candidate entity (C23) may be selected (e.g., from amongst the second set of candidate entities) and linked to the second mention based upon the first matrix and the second matrix.

In accordance with the present disclosure, one or more computing devices and/or methods for linking a mention to an entity are provided. In an example, a document (e.g., article) may be analyzed (e.g., scanned) to identify a plurality of mentions (e.g., text spans that identify who, what, where, etc.), comprising a first mention (e.g., Cleveland) and a second mention (e.g., CLE), in the document. A first set of candidate entities, comprising a first candidate entity (C11) (e.g., the city of Cleveland) and a second candidate entity (C12) (e.g., Grover Cleveland), may be retrieved, and may correspond to the first mention. A second set of candidate entities, comprising a third candidate entity (C23) (e.g., Cleveland International Airport) and the first candidate entity (C11) (e.g., the city of Cleveland), may be retrieved, and may correspond to the second mention. A first mention location corresponding to the first mention may be determined in a (e.g., N-dimensional) vector space. A second mention location corresponding to the second mention may be determined in the vector space. A first candidate location corresponding to the first candidate entity (C11) may be determined in the vector space. A second candidate location corresponding to the second candidate entity (C12) may be determined in the vector space. A third candidate location corresponding to the third candidate entity (C23) may be determined in the vector space. A determination may be made that a first (e.g., Euclidean) distance between the third candidate location and the second mention location is less than a second distance between the first candidate location and the second mention location. Additionally, a determination may be made that a third distance between the first candidate location and the first mention location is less than a fourth distance between the second candidate location and the first mention location. In response to these determinations of distances, the first candidate entity (C11) may be linked to the first mention and to the second mention (e.g., so that the mentions in the document are clustered). For example, even though the third candidate location is closer to the second mention location than the first candidate location, since the first candidate location is closer to the first mention location than the second candidate location (e.g., and the third candidate location may be significantly farther from the first mention location), both the first mention and the second mention may be linked to the first candidate entity (C11) corresponding to the first candidate location.

In accordance with the present disclosure, one or more computing devices and/or methods for linking a mention to an entity are provided. In an example, a document (e.g., article) may be analyzed (e.g., scanned) to identify a plurality of mentions (e.g., text spans that identify who, what, where, etc.), comprising a first mention (e.g., Cleveland) and a second mention (e.g., CLE), in the document. A graph may be generated and may comprise a plurality of nodes comprising a first node corresponding to the first mention and a second node corresponding to the second mention. A weight may be assigned to an edge connecting the first node to the second node. A determination may be made that the first node is assigned a first label corresponding to a first candidate entity (C11) (e.g., the city of Cleveland). The first label assigned to the first node may be propagated to the second node based upon the weight of the edge.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
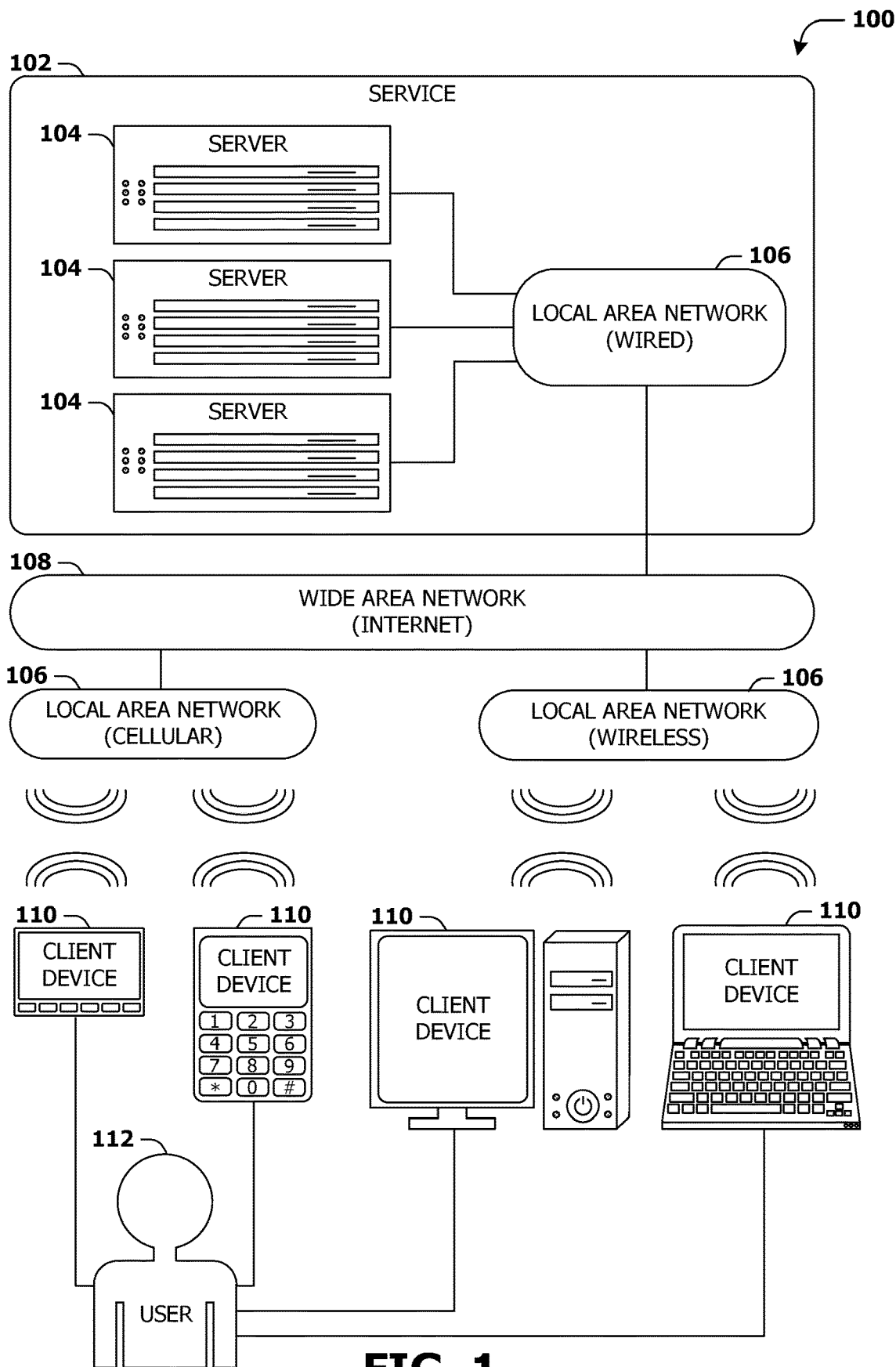
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
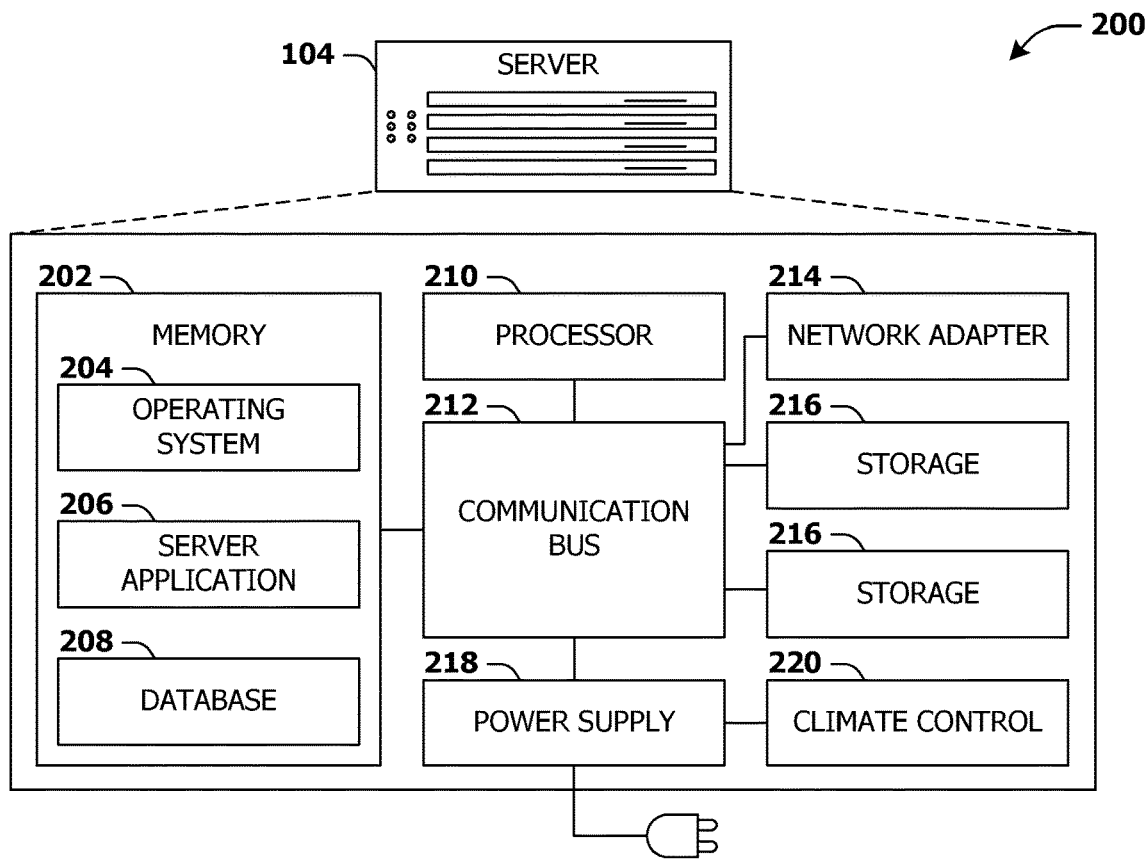
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
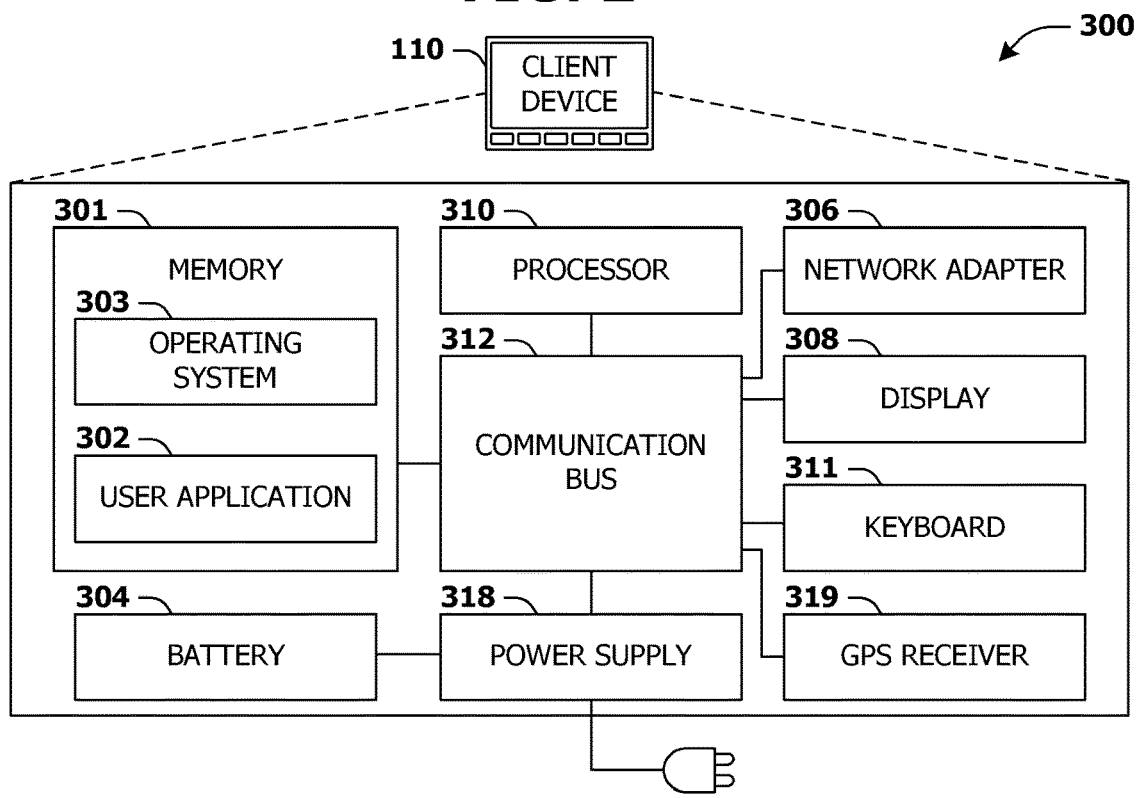
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for linking a mention to an entity and/or entity disambiguation are provided. For example, a user may want to access a document (e.g., news article) pertaining to one or more entities of interest (e.g., world leaders) and/or a topic (e.g., politics) associated with the one or more entities. Identification and/or selection of the document may use and/or require considering (e.g., reading) and/or analyzing one or more pieces of information (e.g., and/or one or more documents), and thus may consume a significant amount of attention, time and/or resources of the user (e.g., to find an appropriate/relevant document, etc.). A document host (e.g., news website) and/or a document portal (e.g., news portal website) may be used to assist the user in accessing the document, by hosting a plurality of documents, including the document, and/or links to the plurality of documents. The document host and/or the document portal may organize at least some of the plurality of documents based upon one or more topics associated with each of the documents and/or based upon one or more entities identified (e.g., mentioned) in text of each document (e.g., which may be used to determine the one or more topics). A text span in the document may be similar to and/or otherwise associated with more than one entity. Thus, the text span may sometimes be associated with an incorrect entity, which may cause an incorrect topic to be associated with the document and/or may cause the document to be mislabeled and/or otherwise incorrectly organized and presented on the document host or the document portal. Thus, in accordance with one or more of the techniques presented herein, a mention in a document that may be associated with two or more candidate entities may be disambiguated using context in the document, such that a (e.g., single) candidate entity is linked to the mention in a manner that is efficient, convenient, low cost and/or timely.

Figure 4A:
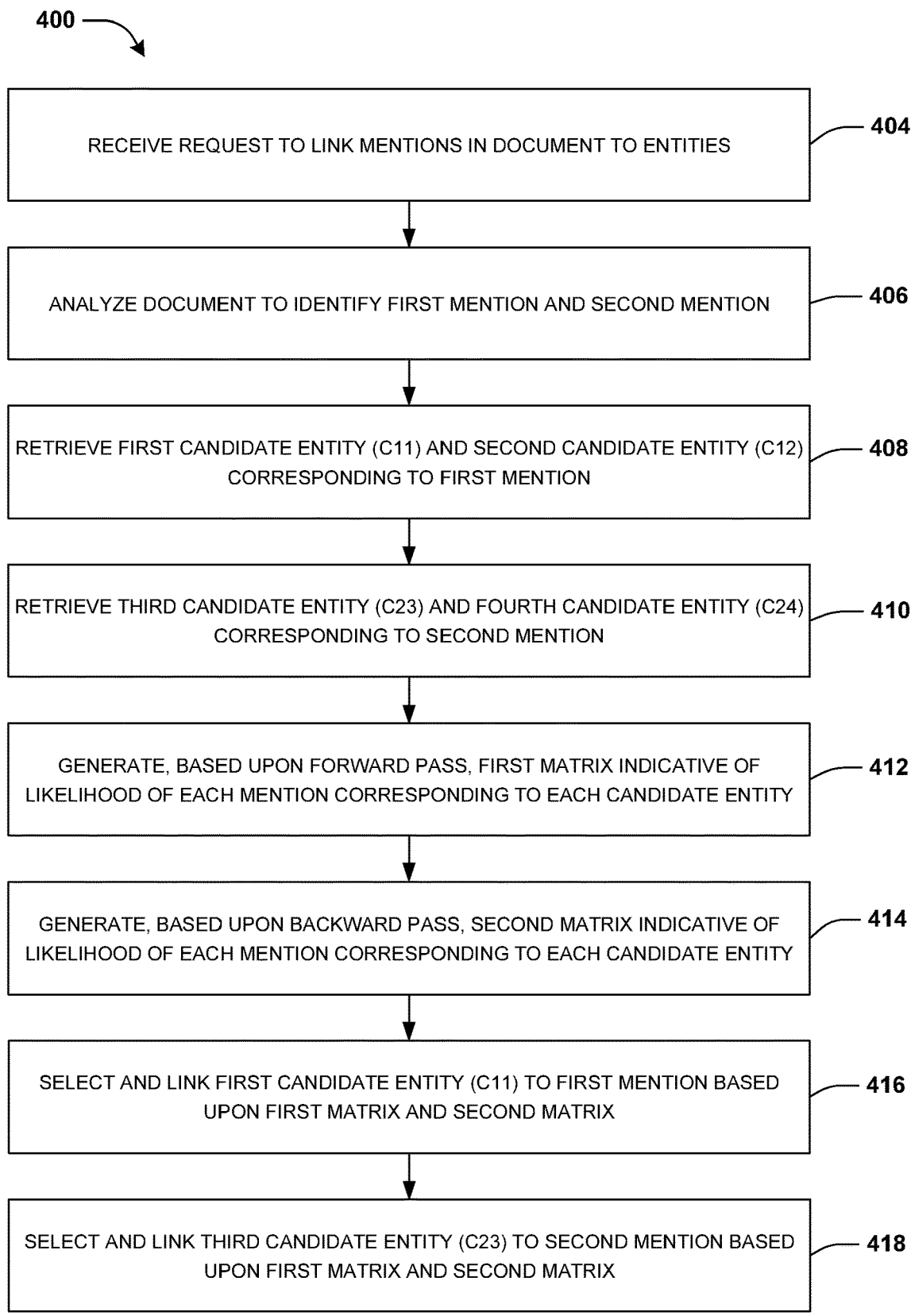
FIG. 4A is a flow chart illustrating an example method for linking a mention to an entity.

An embodiment of linking a mention to an entity via a forward-backward algorithm is illustrated by an example method 400 of FIG. 4A. A user, such as user Jill, and/or a server, such as that of a document host, may access and/or interact with one or more documents. The one or more documents may be accessed and/or interacted with by the user via one or more interfaces provided by a document host and/or a document portal, on an interface of a (e.g., mobile, desktop, laptop, etc.) device. The one or more documents may be retrieved by the server (e.g., from a source) using a query (e.g., via a network connection). For example, the one or more documents may be published by one or more (e.g., news) sources, and may then be retrieved and/or otherwise accessed for processing by the server. Accordingly, at 404, a request to link mentions (e.g., text spans that identify who, what, where, etc.) in a document (e.g., article) to entities (e.g., companies, people, places, events, etc.) may be received (e.g., from an organization logic in the server). The mentions may be in text of the document and/or extracted from an image in the document. For example, a mention may be identified in a title, a byline, a body, a sentence, a comment, etc. It may be appreciated that the document may be an article, such as a news article, a blog, a journal, etc. At 406, the document may be analyzed (e.g., scanned) to identify a plurality of mentions, comprising a first mention (e.g., Cleveland) and a second mention (e.g., New York), in the document. The analyzing may be performed using one or more mention recognition techniques. In an example, the document may comprise one or more sentences in a first language, such as English (e.g., and one or more sentences and/or words in one or more other languages). In an example, the one or more sentences may be analyzed and/or scanned for keywords to identify the mentions (e.g., using natural language processing, word/phrase matching, etc.).

At 408, a first set of candidate entities corresponding to the first mention may be retrieved (e.g., based upon popularity and/or frequency determined from a search log). In an example, the first mention may be used to search a knowledge base, such as an online encyclopedia, a phone book, a directory, an index, etc. for candidate entities that match (e.g., are identical, similar, associated with, etc.) at least some of the first mention and/or one or more terms associated with the first mention. For example, the first mention, Cleveland, may be used to search the online encyclopedia for one or more matches (e.g., in a title of an entry in the online encyclopedia, in the body of the entry, etc.) that may be used as candidate entities. The first set of candidate entities may comprise a first candidate entity (C11) (e.g., the city of Cleveland) and a second candidate entity (C12) (e.g., Grover Cleveland) (e.g., and one or more other candidate entities).

At 410, a second set of candidate entities corresponding to the second mention may be retrieved (e.g., based upon popularity and/or frequency determined from the search log). In an example, the second mention may be used to search the knowledge base for candidate entities that match (e.g., are identical, similar, associated with, etc.) at least some of the second mention and/or one or more terms associated with the second mention. For example, the second mention, New York, may be used to search the online encyclopedia for one or more matches (e.g., in a title of an entry in the online encyclopedia, in the body of the entry, etc.) that may be used as candidate entities. The second set of candidate entities may comprise a third candidate entity (C23) (e.g., the city of New York) and a fourth candidate entity (C24) (e.g., the state of New York) (e.g., and one or more other candidate entities).

At 412, a first matrix may be generated based upon a forward pass of the plurality of mentions. The forward pass may be implemented as part of a forward-backward algorithm. During the implementation of the forward pass, a likelihood of each text span and/or mention corresponding to a candidate entity may be determined, and may be based upon a text span and/or a mention processed (e.g., immediately) before the processing and/or based upon a likelihood of the previous text span and/or the previous mention corresponding to a previous candidate entity. For example, the first mention Cleveland may be determined to have a 60% likelihood of being associated with the first candidate entity (C11), the city of Cleveland, which may be calculated based upon a previous mention of Ohio (e.g., which may have been located near a beginning of the document and thus may have been processed prior to the processing of the first mention) in the document. The first matrix may be indicative of a first likelihood (L11) of the first mention corresponding to the first candidate entity (C11), a second likelihood (L12) of the first mention corresponding to the second candidate entity (C12), a third likelihood (L23) of the second mention corresponding to the third candidate entity (C23), and a fourth likelihood (L24) of the second mention corresponding to the fourth candidate entity (C24).

At 414, a second matrix may be generated based upon a backward pass of the plurality of mentions. The backward pass may be implemented as part of the forward-backward algorithm, which may be associated with a direction opposite that of the forward pass. During the implementation of the backward pass, a likelihood of each text span and/or mention corresponding to a candidate entity may be determined, and may be based upon a text span and/or a mention processed (e.g., immediately) before the processing and/or based upon a likelihood of the previous text span and/or the previous mention corresponding to a previous candidate entity. For example, the second mention New York may be determined to have a 74% likelihood of being associated with the third candidate entity (C23), the city of New York, which may be calculated based upon a previous mention of Manhattan (e.g., which may have been located near an end of the document and thus may have been processed prior to the processing of the first mention) in the document. The second matrix may be indicative of a fifth likelihood (L15) of the first mention corresponding to the first candidate entity, a sixth likelihood (L16) of the first mention corresponding to the second candidate entity (C12), a seventh likelihood (L27) of the second mention corresponding to the third candidate entity (C23), and an eighth likelihood (L28) of the second mention corresponding to the fourth candidate entity (C24).

In an example, the retrieving the first set of candidate entities, the retrieving the second set of candidate entities, the generating the first matrix and/or the generating the second matrix may be performed using an entity embedding model. The entity embedding model may, for example, be generated using a plurality of documents (e.g., entries) extracted from the knowledge base (e.g., the online encyclopedia). For example, articles may be processed such that hyperlinks in each article are transformed to a canonical form for an associated entity, and an article title is the canonical form for the target entity, and the processed articles may be used to train the entity embedding model. A first layer of the entity embedding model may model context of entities (e.g., of the knowledge base), while a second layer of the entity embedding model may model context of text spans (e.g., of the knowledge base). For example, a mention may be received as an input, an entity embedding may be retrieved for the mention, and a nearest neighbor search may be performed amongst entity embeddings for the canonical form of (e.g., all) entities in the knowledge base. The entity embedding model may be compact and thus efficient for implementing on different levels of machines using less resources.

At 416, the first candidate entity (C11) may be selected from amongst the first set of candidate entities based upon the first matrix and the second matrix, and may be linked to the first mention. For example, based upon the first matrix and the second matrix, the first candidate entity (C11) and the second candidate entity (C12) (e.g., and one or more other candidate entities associated with the first mention) may be ranked, and an optimal candidate entity may be selected based upon the rankings. It may be appreciated that the ranking may be performed based upon (e.g., merely) likelihoods in the first matrix and/or the second matrix that correspond to the first mention (e.g., the first likelihood (L11), the second likelihood (L12), the fifth likelihood (L15) and/or the sixth likelihood (L16)), and/or based upon likelihoods in the first matrix and/or the second matrix that correspond to the first mention and/or other mentions.

At 418, the third candidate entity (C23) may be selected from amongst the second set of candidate entities based upon the first matrix and the second matrix, and may be linked to the second mention. For example, based upon the first matrix and the second matrix, the third candidate entity (C23) and the fourth candidate entity (C24) (e.g., and one or more other candidate entities associated with the second mention) may be ranked, and an optimal candidate entity may be selected based upon the rankings. It may be appreciated that the ranking may be performed based upon (e.g., merely) likelihoods in the first matrix and/or the second matrix that correspond to the second mention (e.g., the third likelihood (L23), the fourth likelihood (L24), the seventh likelihood (L27) and the eighth likelihood (L28)), and/or based upon likelihoods in the first matrix and/or the second matrix that correspond to the second mention and/or other mentions.

Figure 4B:
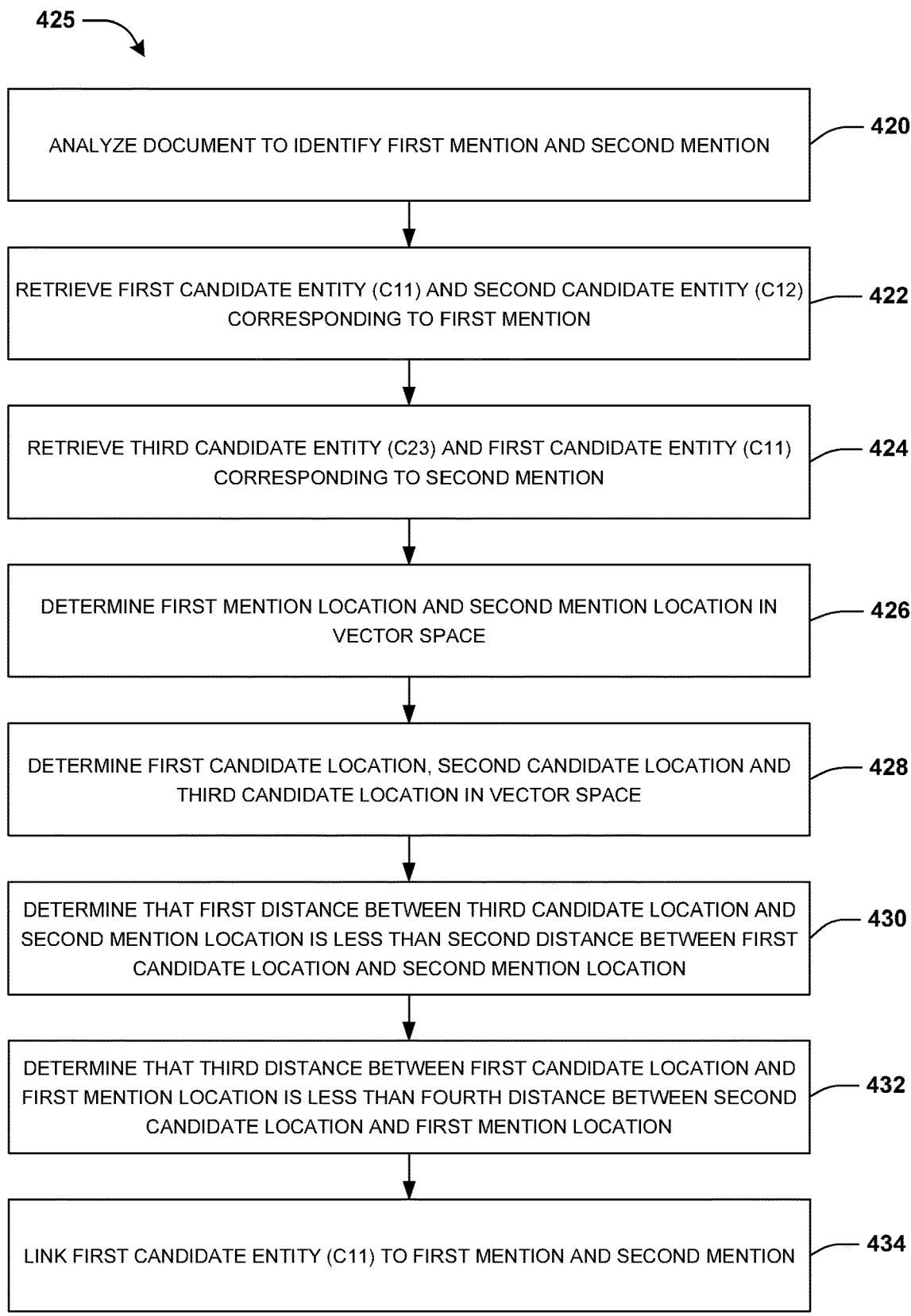
FIG. 4B is a flow chart illustrating an example method for linking a mention to an entity.

An embodiment of linking a mention to an entity via exemplar clustering is illustrated by an example method 425 of FIG. 4B. A user, such as user Jill, and/or a server, such as that of a document host, may access and/or interact with one or more documents. The one or more documents may be accessed and/or interacted with by the user via one or more interfaces provided by a document host and/or a document portal, on an interface of a (e.g., mobile, desktop, laptop, etc.) device. The one or more documents may be retrieved by the server (e.g., from a source) using a query (e.g., via a network connection). For example, the one or more documents may be published by one or more (e.g., news) sources, and may then be retrieved and/or otherwise accessed for processing by the server. Accordingly, at 420, a document (e.g., article) may be analyzed (e.g., scanned) to identify a plurality of mentions, comprising a first mention (e.g., Cleveland) and a second mention (e.g., CLE), in the document. The analyzing may be performed using one or more mention recognition techniques. In an example, the document may comprise one or more sentences in a first language, such as English (e.g., and one or more sentences and/or words in one or more other languages). In an example, the one or more sentences may be analyzed and/or scanned for keywords to identify the mentions (e.g., using natural language processing, word/phrase matching, etc.).

At 422, a first set of candidate entities corresponding to the first mention may be retrieved. In an example, the first mention may be used to search a knowledge base, such as an online encyclopedia, a phone book, a directory, an index, etc. for candidate entities that match (e.g., are identical, similar, associated with, etc.) at least some of the first mention and/or one or more terms associated with the first mention. For example, the first mention, Cleveland, may be used to search the online encyclopedia for one or more matches (e.g., in a title of an entry in the online encyclopedia, in the body of the entry, etc.) that may be used as candidate entities. The first set of candidate entities may comprise a first candidate entity (C11) (e.g., the city of Cleveland) and a second candidate entity (C12) (e.g., Grover Cleveland) (e.g., and one or more other candidate entities).

At 424, a second set of candidate entities corresponding to the second mention may be retrieved. In an example, the second mention may be used to search the knowledge base for candidate entities that match (e.g., are identical, similar, associated with, etc.) at least some of the second mention and/or one or more terms associated with the second mention. For example, the second mention, CLE, may be used to search the online encyclopedia for one or more matches (e.g., in a title of an entry in the online encyclopedia, in the body of the entry, etc.) that may be used as candidate entities. The second set of candidate entities may comprise a third candidate entity (C23) (e.g., Cleveland International Airport) and the first candidate entity (C11) (e.g., the city of Cleveland) (e.g., and one or more other candidate entities).

At 426, a first mention location (e.g., a first point) corresponding to the first mention and a second mention location (e.g., a second point) corresponding to the second mention may be determined in a vector space. The vector space may be an N-dimensional vector space, where each dimension may correspond to an attribute, characteristic, etc. In some examples, the dimensions of the vector space may not correspond to a real-world attribute. The first mention location may correspond to a combination of values of the first mention corresponding to each dimension of the vector space, and the second mention location may correspond to a combination of values of the second mention corresponding to each dimension of the vector space. For example, the first mention location may correspond to a combination of a first value of the first mention corresponding to a geography dimension, a second value of the first mention corresponding to a politics dimension, and/or a third value of the first mention corresponding to an age dimension. In the example, the second mention location may correspond to a combination of a fourth value of the second mention corresponding to the geography dimension, a second value of the second mention corresponding to the politics dimension, and/or a third value of the second mention corresponding to the age dimension.

At 428, a first candidate location (e.g., a third point) corresponding to the first candidate entity (C11), a second candidate location (e.g., a fourth point) corresponding to the second candidate entity (C12) and a third candidate location (e.g., a fifth point) corresponding to the third candidate entity (C23) may be determined in the vector space. The first candidate location may correspond to a combination of values of the first candidate entity (C11) corresponding to each dimension of the vector space, the second candidate location may correspond to a combination of values of the second candidate entity (C12) corresponding to each dimension of the vector space, and the third candidate location may correspond to a combination of values of the third candidate entity (C23) corresponding to each dimension of the vector space.

A first (e.g., Euclidean) distance between the third candidate location (e.g., corresponding to the third candidate entity (C23), Cleveland International Airport) and the second mention location (e.g., corresponding to the second mention, CLE) in the vector space may be measured. A second distance between the first candidate location (e.g., corresponding to the first candidate entity (C11), the city of Cleveland) and the second mention location (e.g., corresponding to the second mention, CLE) is determined. A third distance between the first candidate location (e.g., corresponding to the first candidate entity (C11), the city of Cleveland) and the first mention location (e.g., corresponding to the first mention, Cleveland) may be measured. A fourth distance between the second candidate location (e.g., corresponding to the second candidate entity (C12), Grover Cleveland) and the first mention location (e.g., corresponding to the first mention, Cleveland) is measured.

At 430, a determination may be made that the first distance is less than the second distance (e.g., since CLE is the airport code for Cleveland International Airport). At 432, a determination may be made that the third distance is less than the fourth distance.

In exemplar clustering, linking may be performed in a manner that minimizes distances between each mention and each candidate entity across a grouping of more than one mention and minimizes and/or mitigates a number of candidate entities to be selected, rather than being performed in a manner that minimizes a distance for a single mention.

Thus, at 434, the first candidate entity (C11) (e.g., the city of Cleveland) may be linked to (e.g., both) the first mention (e.g., Cleveland) and the second mention (e.g., CLE). That is, even though the second mention had a location in the vector space closer to the third candidate entity (C23), it may be linked to the first candidate entity (C11) (e.g., due to the first candidate location being within a threshold distance of the second mention location) so that the first mention and the second mention are, in combination, linked to (e.g., merely) one candidate entity, rather than two different candidate entities.

In an example, the linking of the first candidate entity (C11) to both the first mention and the second mention may be performed responsive to determining that linking the first candidate entity (C11) to the second mention will mitigate/reduce a number of entities linked to mentions in the document.

In an example, the linking of the first candidate entity (C11) to both the first mention and the second mention may be performed responsive to determining that the first candidate location is closer to more mention locations of mentions in the document than the third candidate location. For example, the first candidate location may be determined to be closer to 8 mention locations of mentions in the document while the third candidate location may be determined to be closer to 2 mention locations of mentions in the document.

In an example, the retrieving the first set of candidate entities, the retrieving the second set of candidate entities, the determining the first mention location, the determining the second mention location, the determining the first candidate location, the determining the second candidate location and/or the determining the third candidate location may be performed using an entity embedding model.

Figure 4C:
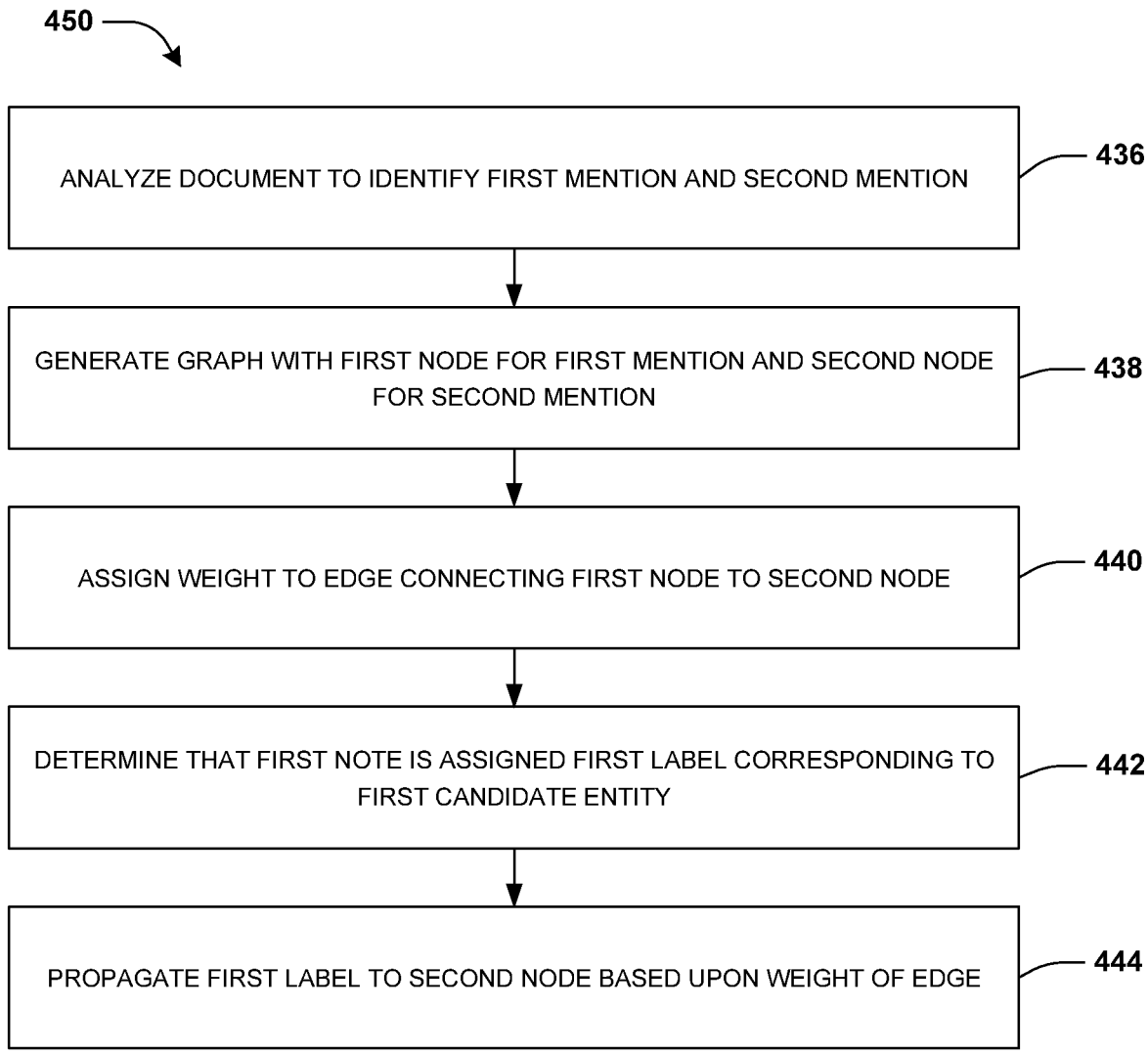
FIG. 4C is a flow chart illustrating an example method for propagating a label.

An embodiment of label propagation is illustrated by an example method 450 of FIG. 4C. A user, such as user Jill, and/or a server, such as that of a document host, may access and/or interact with one or more documents. The one or more documents may be accessed and/or interacted with by the user via one or more interfaces provided by a document host and/or a document portal, on an interface of a (e.g., mobile, desktop, laptop, etc.) device. The one or more documents may be retrieved by the server (e.g., from a source) using a query (e.g., via a network connection). For example, the one or more documents may be published by one or more (e.g., news) sources, and may then be retrieved and/or otherwise accessed for processing by the server. Accordingly, at 436, a document (e.g., article) may be analyzed (e.g., scanned) to identify a plurality of mentions, comprising a first mention (e.g., Cleveland) and a second mention (e.g., CLE), in the document. The analyzing may be performed using one or more mention recognition techniques. In an example, the document may comprise one or more sentences in a first language, such as English (e.g., and one or more sentences and/or words in one or more other languages). In an example, the one or more sentences may be analyzed and/or scanned for keywords to identify the mentions (e.g., using natural language processing, word/phrase matching, etc.).

At 438, a graph representative of the document may be generated, and may comprise a plurality of nodes. The plurality of nodes may comprise a first node corresponding to (e.g., representative of) the first mention and a second node corresponding to (e.g., representative of) the second mention (e.g., and one or more nodes corresponding to one or more other mentions). Each node in the graph may be connected to another node by a connecting edge. For example, the first node may be connected to the second node by an edge.

At 440, a weight may be assigned to the edge connecting the first node to the second node. The weight may represent a strength of a connection between the first mention corresponding to the first node and the second mention corresponding to the second node. The weight may be based upon a similarity between the first mention and the second mention (e.g., how many characters apart the mentions are) and/or based upon a distance between a first mention location of the first mention and a second mention location of the second mention in a vector space.

At 442, a determination may be made that the first node is assigned a first label corresponding to a first candidate entity (C11) (e.g., the city of Cleveland). The first label may have been assigned to the first node in response to a determination that a confidence in the first label for the first node meets a threshold. The second node may not be labeled. For example, a second label corresponding to a second candidate entity may not have been assigned to the second node in response to a determination that a confidence in the second label for the second node does not meet the threshold.

At 444, the first label that is assigned to the first node may be propagated (e.g., assigned again) to the second node based upon the weight of the edge. For example, if the weight exceeds a weight threshold, the first label may be propagated to the second node. In another example, the weight of the edge connecting the first node to the second node may be compared to weights of one or more edges connecting other nodes to the second node. For example, if a third node is also connected to the second node by a second edge, and the second edge is assigned a second weight, the first label may be propagated to the second node in response to determining that the weight of the edge connecting the first node to the second node is greater than the second weight of the second edge connecting the third node to the second node.

In an example, the first candidate entity (C11) may be linked to the first mention based upon the assignment of the first label to the first node and/or the first candidate entity (C11) may be linked to the second mention based upon the propagation of the first label to the second node.

In an example, a traversal logic may (e.g., randomly) traverse the graph from node to node. During the traversing, when a node is reached and is determined to not be labeled, a determination may be made as to whether a label of a neighboring node may be propagated to the node.

It may be appreciated that entity disambiguation may be based upon local context (e.g., corresponding to verbs used (e.g., an athlete plays and/or wins, while an actor directs and/or writes)), document context (e.g., corresponding to co-occurring entities in a document), world knowledge (e.g., associated with a level of coverage) and/or locational context (e.g., determined based upon GPS in a device of a user accessing the server, based upon an IP address associated with the user, etc.).

Figure 5A:
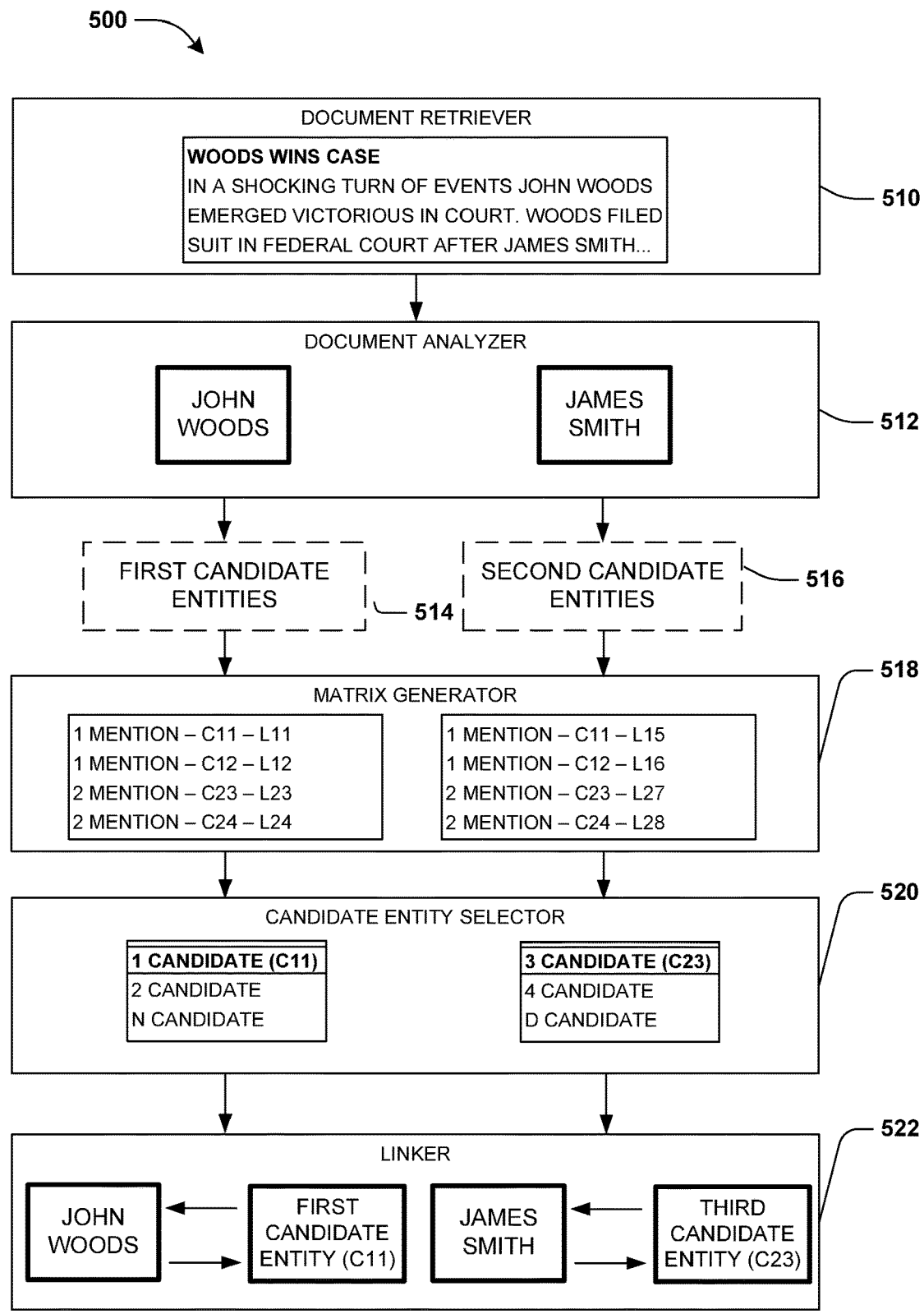
FIG. 5A is a component block diagram illustrating an example system for linking a mention to an entity.

FIG. 5A illustrates an example of a system 500 for linking a mention to an entity using a forward-backward algorithm. Document retriever 510 may receive an indication of a document to access and/or retrieve (e.g., the news article "Woods Wins Case"). Document analyzer 512 may analyze (e.g., search through) information (e.g., text) of the document to identify text spans corresponding to mentions. For example, the document analyzer 512 may identify a first mention of John Woods and a second mention of James Smith. First candidate entities 514 corresponding to the first mention of John Woods may be retrieved, and second candidate entities 516 corresponding to the second mention of James Smith may be retrieved.

A matrix generator 518 may use the first mention, the first candidate entities, the second mention and/or the second candidate entities to generate a first matrix and/or a second matrix corresponding to the document. The first matrix may be generated based upon a forward pass of the document, while the second matrix may be generated based upon a backwards pass of the document. A candidate entity selector 520 may select a first candidate entity (C11) from the first candidate entities and a third candidate entity (C23) from the second candidate entities based upon the first matrix and/or the second matrix. A linker 522 may, based upon the selection of the candidate entity selector 520, link the first mention of John Woods to the first candidate entity (C11), and link the second mention of James Smith to the third candidate entity (C23).

Figure 5B:
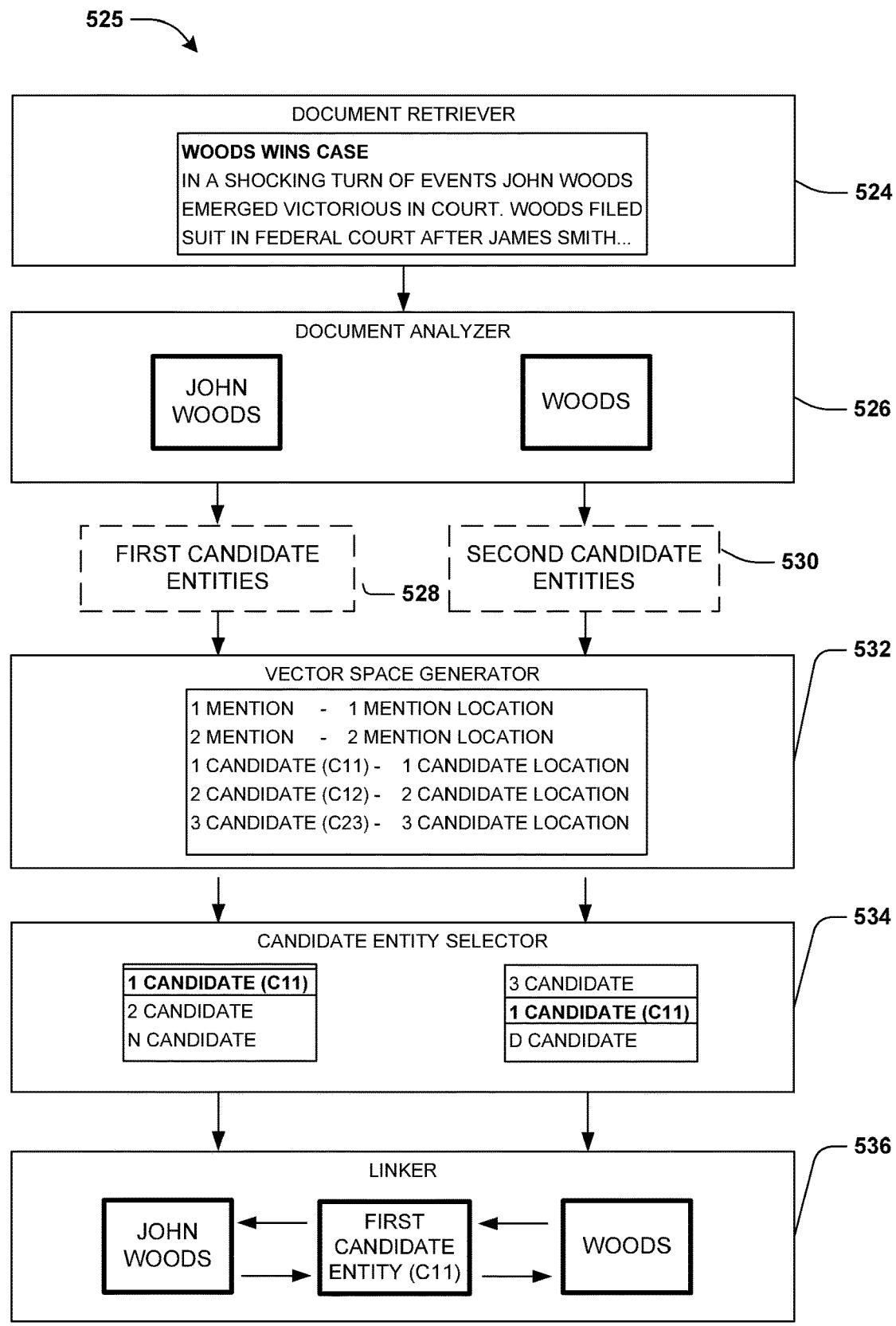
FIG. 5B is a component block diagram illustrating an example system for linking a mention to an entity.

FIG. 5B illustrates an example of a system 525 for linking a mention to an entity using exemplar clustering. Document retriever 524 may receive an indication of a document to access and/or retrieve (e.g., the news article "Woods Wins Case"). Document analyzer 526 may analyze (e.g., search through) information (e.g., text) of the document to identify text spans corresponding to mentions. For example, the document analyzer 526 may identify a first mention of John Woods and a second mention of Woods. First candidate entities 528 corresponding to the first mention of John Woods may be retrieved, and second candidate entities 530 corresponding to the second mention of Woods may be retrieved.

A vector space generator 532 may use the first mention, the first candidate entities, the second mention and/or the second candidate entities to generate a vector space with locations and/or vectors corresponding to the document. For example, locations in vector space may be determined for each of the mentions and/or for each of the candidate entities. In an example, the vector space generator 532 may use a (e.g., existing) text source (e.g., search logs, text documents) to generate the vector space. The text source may be stored as a statistical model and/or a database of words and/or vectors, etc. It may be appreciated that the locations and/or vectors corresponding to each of the mentions and/or each of the candidate entities may be determined (e.g., inferred) using the text source. A candidate entity selector 534 may select a first candidate entity (C11) from the first candidate entities and the first candidate entity (C11) from the second candidate entities based upon the locations in the vector space (e.g., and/or distances between the locations). A linker 536 may, based upon the selection of the candidate entity selector 534, link the first mention of John Woods to the first candidate entity (C11), and also link the second mention of Woods to the first candidate entity (C11).

Figure 5C:
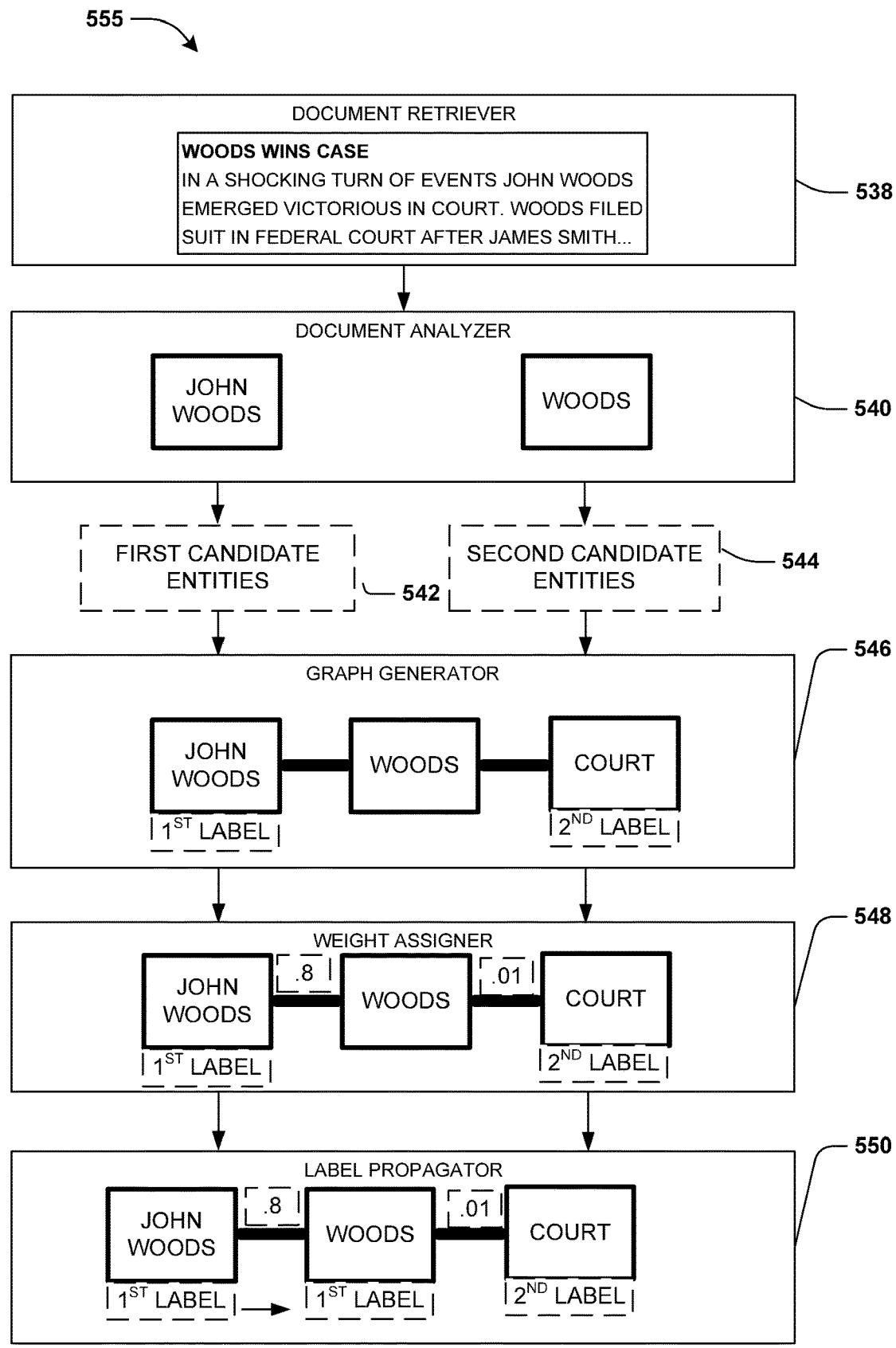
FIG. 5C is a component block diagram illustrating an example system for propagating a label.

FIG. 5C illustrates an example of a system 555 for label propagation. Document retriever 538 may receive an indication of a document to access and/or retrieve (e.g., the news article "Woods Wins Case"). Document analyzer 540 may analyze (e.g., search through) information (e.g., text) of the document to identify text spans corresponding to mentions. For example, the document analyzer 540 may identify a first mention of John Woods and a second mention of Woods. First candidate entities 542 corresponding to the first mention of John Woods may be retrieved, and second candidate entities 544 corresponding to the second mention of Woods may be retrieved.

A graph generator 546 may generate a graph representative of the document based upon the first mention, the first candidate entities, the second mention and/or the second candidate entities. The graph may comprise a first node corresponding to the first mention, a second node corresponding to the second mention, and a third node corresponding to a third mention of Court in the document. The first node may be assigned a first label corresponding to a first candidate entity, the third node may be assigned a second label corresponding to a second candidate entity and/or the second node may not be assigned a label.

A weight assigner 548 may assign a first weight (e.g., 0.8) to an edge connecting the first node to the second node, and may assign a second weight (e.g., 0.1) to a second edge connecting the second node to the third node. A label propagator 550 may propagate the first label to the second node in response to determining that the first weight is greater than the second weight.

It may be appreciated that the disclosed subject matter may assist in improving the organization of content associated with various informational, educational and/or instructional applications, such as a guidebook for a location (e.g., a zoo, museum, etc.), learning to cook, learning a language (e.g., German, C++, etc.) and/or learning a subject (e.g., electromagnetics).

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

It may be appreciated that the disclosed subject matter may allow for content to be organized in a reduced amount of time with an improved (e.g., greater) speed, and may further enable presentation of content in a manner that allows for users to find relevant and/or desired material faster and/or more efficiently without having to browse or otherwise access irrelevant and non-desired material, thus reducing unnecessary processor, memory and/or bandwidth usage.

Figure 6:
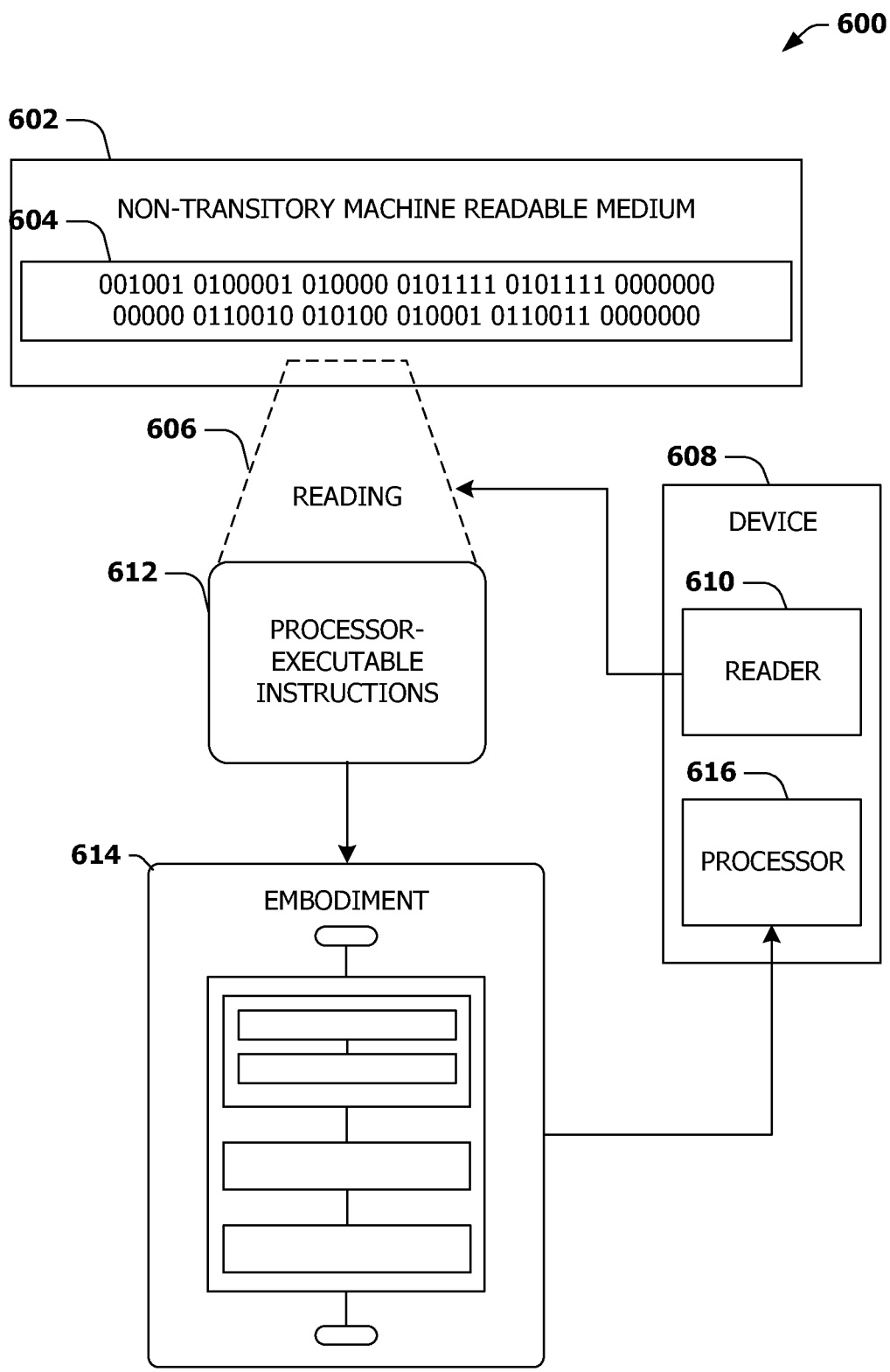
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance and/or implementation of an embodiment 614, such as at least some of the example method 400 of FIG. 4A, the example method 425 of FIG. 4B and/or the example method 450 of FIG. 4C, for example, and/or at least some of the example system 500 of FIG. 5A, the example system 525 of FIG. 5B, and/or the example system 555 of FIG. 5C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented method for linking a mention to an entity in one or more documents hosted on at least one of a document host or a document portal, comprising:
    receiving a request to link mentions in a document to entities, wherein the document is an article published by a source;
    retrieving, by a server, the document from the source via a network connection;
    processing the retrieved document by:
        scanning the document, using at least one of natural language processing or word/phrase matching, to identify a plurality of mentions, in the document, comprising a first mention in the document and a second mention in the document;
        searching a knowledge base for candidate entities that match the first mention identified in the document and retrieving, from the knowledge base, a first set of candidate entities, comprising a first candidate entity and a second candidate entity, corresponding to the first mention; and
        searching the knowledge base for candidate entities that match the second mention identified in the document and retrieving, from the knowledge base, a second set of candidate entities, comprising a third candidate entity and a fourth candidate entity, corresponding to the second mention;
    processing a plurality of documents extracted from the knowledge base to generate processed documents by transforming one or more hyperlinks in each document to a canonical form for an associated entity;
    training an entity embedding model using the processed documents, wherein a first layer of the entity embedding model is associated with modeling context of entities of the knowledge base and a second layer of the entity embedding model is associated with modeling context of text spans of the knowledge base;
    generating, using the entity embedding model and based upon a forward pass of the plurality of mentions, a first matrix indicative of a first likelihood of the first mention corresponding to the first candidate entity, a second likelihood of the first mention corresponding to the second candidate entity, a third likelihood of the second mention corresponding to the third candidate entity, and a fourth likelihood of the second mention corresponding to the fourth candidate entity;
    generating, using the entity embedding model and based upon a backward pass of the plurality of mentions, a second matrix indicative of a fifth likelihood of the first mention corresponding to the first candidate entity, a sixth likelihood of the first mention corresponding to the second candidate entity, a seventh likelihood of the second mention corresponding to the third candidate entity, and an eighth likelihood of the second mention corresponding to the fourth candidate entity;
    selecting, from the first set of candidate entities, the first candidate entity but not the second candidate entity and linking the first candidate entity but not the second candidate entity to the first mention based upon the first matrix and the second matrix;
    selecting, from the second set of candidate entities, the third candidate entity but not the fourth candidate entity and linking the third candidate entity but not the fourth candidate entity to the second mention based upon the first matrix and the second matrix, wherein at least one of the selecting the first candidate entity or the selecting the third candidate entity is based upon at least one of:
        local context corresponding to one or more verbs used in the article being indicative of actions associated with a first profession associated with at least one of the first candidate entity or the third candidate entity, wherein one or more second verbs not used in the article are indicative of actions associated with a second profession associated with at least one of the second candidate entity or the fourth candidate entity; or
        locational context determined based upon GPS of a device of a user;
    determining a topic of the article based upon the linking of the first candidate entity but not the second candidate entity to the first mention and the linking of the third candidate entity but not the fourth candidate entity to the second mention;
    receiving a second request to link second mentions in a second document to second entities, wherein the second document is a second article published by a second source;
    retrieving, by the server, the second document from the source via a second network connection;
    processing the retrieved second document by:
        scanning the second document, using at least one of natural language processing or word/phrase matching, to identify a second plurality of mentions, in the second document, comprising a third mention and a fourth mention;
        searching the knowledge base for candidate entities that match the third mention identified in the second document and retrieving, from the knowledge base, a third set of candidate entities, comprising a fifth candidate entity and a sixth candidate entity, corresponding to the third mention; and
        searching the knowledge base for candidate entities that match the fourth mention identified in the second document and retrieving, from the knowledge base, a fourth set of candidate entities, comprising a seventh candidate entity and an eighth candidate entity, corresponding to the fourth mention;
    generating, using the entity embedding model and based upon a forward pass of the second plurality of mentions, a third matrix indicative of a ninth likelihood of the third mention corresponding to the fifth candidate entity, a tenth likelihood of the third mention corresponding to the sixth candidate entity, an eleventh likelihood of the fourth mention corresponding to the seventh candidate entity, and a twelfth likelihood of the fourth mention corresponding to the eighth candidate entity;

generating, using the entity embedding model and based upon a backward pass of the second plurality of mentions, a fourth matrix indicative of a thirteenth likelihood of the third mention corresponding to the fifth candidate entity, a fourteenth likelihood of the third mention corresponding to the sixth candidate entity, a fifteenth likelihood of the fourth mention corresponding to the seventh candidate entity, and a sixteenth likelihood of the fourth mention corresponding to the eighth candidate entity;

selecting, from the third set of candidate entities, the fifth candidate entity but not the sixth candidate entity and linking the fifth candidate entity but not the sixth candidate entity to the third mention based upon the third matrix and the fourth matrix;

selecting, from the fourth set of candidate entities, the seventh candidate entity but not the eighth candidate entity and linking the seventh candidate entity but not the eighth candidate entity to the fourth mention based upon the third matrix and the fourth matrix, wherein at least one of the selecting the fifth candidate entity or the selecting the seventh candidate entity is based upon at least one of:

second local context corresponding to one or more third verbs used in the second article being indicative of actions associated with a third profession associated with at least one of the fifth candidate entity or the seventh candidate entity, wherein one or more fourth verbs not used in the second article are indicative of actions associated with a fourth profession associated with at least one of the sixth candidate entity or the eighth candidate entity; or second locational context determined based upon GPS of a second device of a second user;

determining a second topic of the second article based upon the linking of the fifth candidate entity but not the sixth candidate entity to the third mention and the linking of the seventh candidate entity but not the eighth candidate entity to the fourth mention; and organizing and presenting, by the server, the article and the second article among a plurality of articles on at least one of a document host or a document portal based upon the topic of the article and the second topic of the second article.

2. The method of claim 1, wherein:
at least one of the selecting the first candidate entity or the selecting the third candidate entity is based upon the local context corresponding to the one or more verbs used in the article being indicative of the actions associated with the first profession associated with at least one of the first candidate entity or the third candidate entity; and
at least one of the selecting the fifth candidate entity or the selecting the seventh candidate entity is based upon the second local context corresponding to the one or more second verbs used in the second article being indicative of the actions associated with the third profession associated with at least one of the fifth candidate entity or the seventh candidate entity.

3. The method of claim 1, wherein:
at least one of the selecting the first candidate entity or the selecting the third candidate entity is based upon a level of coverage associated with the article and corresponding to world knowledge associated with the article; and
at least one of the selecting the fifth candidate entity or the selecting the seventh candidate entity is based upon a second level of coverage associated with the second article and corresponding to world knowledge associated with the second article.

4. The method of claim 1, wherein:
at least one of the selecting the first candidate entity or the selecting the third candidate entity is based upon the locational context determined based upon the GPS of the device of the user; and
at least one of the selecting the fifth candidate entity or the selecting the seventh candidate entity is based upon the second locational context determined based upon the GPS of the second device of the second user.

5. The method of claim 1, wherein:
at least one of the selecting the first candidate entity or the selecting the third candidate entity is based upon an IP address associated with the user; and
at least one of the selecting the fifth candidate entity or the selecting the seventh candidate entity is based upon a second IP address associated with the second user.

6. The method of claim 1, wherein the processing the retrieved document comprises scanning both text of the document and an image in the document to identify the plurality of mentions.

7. The method of claim 6, wherein the first mention is identified in the text of the document and the second mention is identified in the image of the document.

8. A computing device comprising:
a processor; and
memory comprising processor-executable instructions that when executed by the processor cause performance of operations, the operations comprising:
processing a plurality of documents extracted from a knowledge base to generate processed documents by transforming one or more hyperlinks in each document to a canonical form for an associated entity;
training an entity embedding model using the processed documents, wherein a first layer of the entity embedding model models context of entities of the knowledge base and a second layer of the entity embedding model models context of text spans of the knowledge base;
analyzing a document to identify a plurality of mentions, comprising a first mention and a second mention, in the document;
searching the knowledge base for candidate entities that match the first mention identified in the document and retrieving, from the knowledge base and using the entity embedding model, a first set of candidate entities, comprising a first candidate entity and a second candidate entity, corresponding to the first mention;
searching the knowledge base for candidate entities that match the second mention identified in an image in the document and retrieving, from the knowledge base and using the entity embedding model, a second set of candidate entities, comprising a third candidate entity and the first candidate entity, corresponding to the second mention;
determining a first mention location corresponding to the first mention in a vector space;

determining a second mention location corresponding to the second mention in the vector space;
determining a first candidate location corresponding to the first candidate entity in the vector space;
determining a second candidate location corresponding to the second candidate entity in the vector space;
determining a third candidate location corresponding to the third candidate entity in the vector space;
linking both the first mention in the document and the second mention in the document to one candidate entity, comprising the first candidate entity but not the third candidate entity, responsive to:
determining that a first distance between the third candidate location corresponding to the third candidate entity and the second mention location corresponding to the second mention in the document is less than a second distance between the first candidate location corresponding to the first candidate entity and the second mention location corresponding to the second mention in the document;
determining that the second distance between the first candidate location corresponding to the first candidate entity and the second mention location corresponding to the second mention in the document is less than a threshold distance; and
determining that a third distance between the first candidate location corresponding to the first candidate entity and the first mention location corresponding to the first mention in the document is less than a fourth distance between the second candidate location corresponding to the second candidate entity and the first mention location corresponding to the first mention in the document;
determining a topic of the document based upon the linking of the first candidate entity to both the first mention and to the second mention;
selecting one or more candidate entities based upon at least one of:
local context corresponding to one or more verbs used in a second document being indicative of actions associated with a first profession associated with the one or more candidate entities; or
locational context determined based upon GPS of a device of a user;
determining a second topic of the second document based upon the selection of the one or more candidate entities; and
organizing and presenting the document and the second document on a document host based upon the topic of the document and the second topic of the second document.

9. The computing device of claim 8, the linking performed responsive to determining that linking the first candidate entity to the second mention will mitigate a number of entities linked to mentions in the document.

10. The computing device of claim 8, the linking performed responsive to determining that the first candidate location is closer to more mention locations of mentions in the document than the third candidate location.

11. The computing device of claim 8, the vector space comprising a plurality of dimensions.

12. The computing device of claim 8, the analyzing performed responsive to receiving a request to link mentions in the document to entities.

13. The computing device of claim 8, at least one of the retrieving the first set of candidate entities, the retrieving the second set of candidate entities, the determining the first mention location, the determining the second mention location, the determining the first candidate location, the determining the second candidate location or the determining the third candidate location performed using the entity embedding model.

14. A non-transitory machine readable medium having stored thereon processor-executable instructions that when executed cause performance of operations, the operations comprising:
retrieving, by a server, a document from a source via a network connection;
analyzing the document to identify a plurality of mentions, comprising a first mention and a second mention, in the document;
processing a plurality of documents extracted from a knowledge base to generate processed documents by transforming one or more hyperlinks in each document to a canonical form for an associated entity;
training an entity embedding model using the processed documents, wherein a first layer of the entity embedding model models context of entities of the knowledge base and a second layer of the entity embedding model models context of text spans of the knowledge base;
generating, using the entity embedding model, a graph with a plurality of nodes comprising a first node corresponding to the first mention and a second node corresponding to the second mention;
assigning a weight to an edge connecting the first node to the second node;
determining that the first node is assigned a first label corresponding to a first candidate entity;
randomly traversing the graph, using a traversal logic, to determine whether to label a node and, upon determining not to label the node, determine whether to propagate a label of a neighboring node to the node;
propagating the first label assigned to the first node to the second node based upon the weight of the edge;
determining a topic of the document based upon (i) the propagating of the first label assigned to the first node to the second node and (ii) local context corresponding to one or more verbs used in the document being indicative of actions associated with a first profession associated with the first candidate entity;
retrieving, by the server, a second document from the source via a second network connection;
analyzing the second document to identify a second plurality of mentions, comprising a third mention and a fourth mention, in the second document;
generating, using the entity embedding model, a second graph with a second plurality of nodes comprising a third node corresponding to the third mention and a fourth node corresponding to the fourth mention;
assigning a second weight to a second edge connecting the third node to the fourth node;
determining that the third node is assigned a third label corresponding to a second candidate entity;
propagating the third label assigned to the third node to the fourth node based upon the second weight of the second edge;
determining a second topic of the second document based upon (i) the propagating of the third label assigned to the third node to the fourth node and (ii) second local context corresponding to one or more second verbs used in the document being indicative of actions associated with a second profession associated with the second candidate entity; and organizing and presenting the document and the second document among a plurality of articles based upon the topic and the second topic.

15. The non-transitory machine readable medium of claim 14, the weight determined based upon a similarity between the first mention and the second mention.

16. The non-transitory machine readable medium of claim 14, the weight determined based upon a distance between a first mention location corresponding to the first mention in a vector space and a second mention location corresponding to the second mention in the vector space, wherein the first mention location corresponds to a combination of at least two of a first value of the first mention corresponding to a geography dimension, a second value of the first mention corresponding to a politics dimension or a third value of the first mention corresponding to an age dimension; and wherein the second mention location corresponds to a combination of at least two of a fourth value of the second mention corresponding to the geography dimension, a fifth value of the second mention corresponding to the politics dimension or a sixth value of the second mention corresponding to the age dimension.

17. The non-transitory machine readable medium of claim 14, the operations comprising:

linking the first candidate entity to the first mention based upon the assignment of the first label to the first node; and linking the first candidate entity to the second mention based upon the propagation of the first label to the second node.

18. The non-transitory machine readable medium of claim 14, the propagating comprising:

propagating the first label assigned to the first node to the second node responsive to determining that the weight of the edge is greater than a third weight of a third edge connecting the second node to a fifth node.

19. The non-transitory machine readable medium of claim 18, the operations comprising:

determining that the third node is assigned a second label corresponding to a third candidate entity.

* * * * *